United States Patent [19]

Dick et al.

[11] Patent Number: 4,509,781
[45] Date of Patent: Apr. 9, 1985

[54] ISOLATED BUMPER FOR DAMPING VIBRATIONS IN VEHICLES

[75] Inventors: Melvin E. Dick, Fenton; Linn A. Peterson, Milford, both of Mich.

[73] Assignee: General Motors Corporation, Detroit, Mich.

[21] Appl. No.: 419,935

[22] Filed: Sep. 20, 1982

[51] Int. Cl.³ .............................................. B60R 19/06
[52] U.S. Cl. ..................... 293/104; 293/136; 293/155; 267/140; 188/379
[58] Field of Search ............... 293/104, 132, 134–137, 293/155; 267/8 R, 139, 140, 116; 188/379

[56] References Cited

U.S. PATENT DOCUMENTS

| 1,858,541 | 5/1932 | Duffy | 293/136 |
| 1,867,753 | 7/1932 | Paton | 293/104 |
| 2,181,245 | 11/1939 | McIntyre | 293/136 |
| 2,199,084 | 4/1940 | Schieferstein | 293/104 |
| 3,734,554 | 5/1973 | Schwabenlender | 293/136 |
| 3,876,244 | 4/1975 | Haberle et al. | 293/136 |
| 3,880,455 | 4/1975 | Toemmeraas | 293/136 |
| 3,989,293 | 11/1976 | Haberle et al. | 293/136 |
| 4,054,311 | 10/1977 | Gute | 293/134 |

FOREIGN PATENT DOCUMENTS

| 2216270 | 10/1973 | Fed. Rep. of Germany | 293/136 |
| 2534136 | 2/1976 | Fed. Rep. of Germany | 293/136 |
| 1404601 | 9/1975 | United Kingdom | 213/136 |

Primary Examiner—Robert B. Reeves
Assistant Examiner—Dennis H. Pedder
Attorney, Agent, or Firm—Charles R. White

[57] ABSTRACT

A bumper/energy absorber system is resiliently mounted at the body mounting location to allow the bumper/energy absorber system to vibrate freely both vertically and in pitch at its natural frequency. The mounting spring rate is selected to use the dynamic energy of the bumper/energy absorbing system to attenuate steering column vibrations excited through the vehicle body structure by the shaking forces of the engine within a predetermined speed range. The mounting is designed to minimize bumper movement relative to the body from forces directly applied to the bumper from loads such as bumper jacking.

3 Claims, 3 Drawing Figures

ISOLATED BUMPER FOR DAMPING VIBRATIONS IN VEHICLES

This invention relates to vibration damping and more particularly to a new and improved vehicle bumper isolated by special resilient mounts from the associated vehicle to act as an auxiliary mass to damp vibrations experienced by the vehicle body and other components.

With transversely mounted vehicle power packages comprising internal combustion engines and automatic transmissions, vibration of the associated vehicle body and components therein may occur at predetermined engine speeds, such as at an idle speed range from 600–800 rpm. These vehicular vibrations often referred to as idle shake result from low rpm engine firing causing the engine to rock on the motor mount to produce harmonic vibration of the vehicle and components therein. Such vibrations may build up to an extent that they become objectionable to vehicle occupants and to the vehicle operator particularly if there is a large buildup of the amplitude of the vibrations of components, such as the steering column and seats.

Prior to the present invention, auxiliary masses for reducing transient, as well as self-excited vibrations, have been effectively utilized in many mechanisms. These masses are usually mounted within openings in the mechanism and act as a damper to minimize the buildup of vibration amplitudes. In contrast to the above prior mechanical vibration dampers, this invention effectively and advantageously utilizes an existing mass presently in a vehicle to act as a damper to prevent the buildup of vibration amplitude in the vehicle body as well as the steering column and other components. More particularly, this invention advantageously utilizes the vehicle bumper and the connected telescopic energy absorbers as a mass damper to inhibit the vehicle body from acting as a vibrating beam and thereby reduce the buildup of vibratory amplitude which may be objectionable to vehicle occupants. Accordingly, this invention features a tuned bumper to improve idle shake response at relatively small costs and with minimized mass penalty.

In the preferred design, an elastomer isolator is incorporated between the vehicle body and bumper supporting energy absorbers so that the bumper and energy absorbers can act as a mass damper to oppose the buildup of vibration amplitude of the vehicle body and components resulting from operation of the internal combustion engine at predetermined engine speeds. In the preferred embodiment of the invention, bumper jacking is permitted with new and improved construction that will mechanically ground the bumper and support to the vehicle body under load conditions imposed by the bumper jack.

It is a feature, object and advantage of this invention to provide a new and improved bumper operatively interconnected with a vehicle body or preloaded resilient vibration isolators that allow the bumper to act as a damper to oppose the buildup of vibratory amplitudes in the body and components therein so that the comfort of the vehicle occupant is enhanced.

These and other features, objects and advantages of this invention will be more apparent from the following detailed description and drawings in which.

Figure 1:
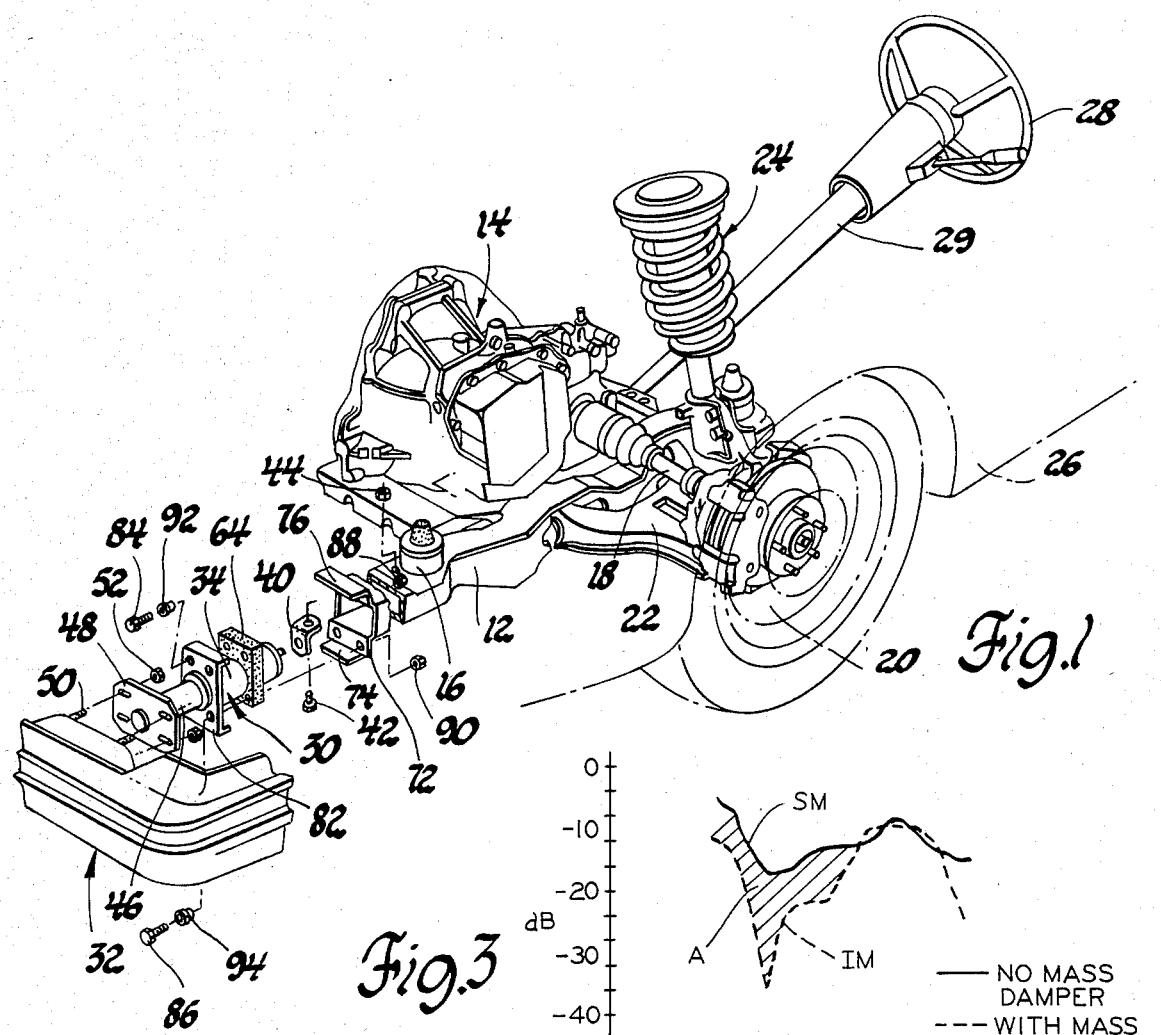
FIG. 1 is an isometric view with parts exploded of a portion of a front wheel drive vehicle.

Turning now in greater detail to the drawing, FIG. 1 shows components of a forward portion of a vehicle including frame side rail 12 on which power package 14, comprising an internal combustion engine and an automatic transmission, is supported by resilient elastomeric mounts 16. An output shaft 18 driven by the power package drives the front dirigible wheel assembly 20 that is pivotally supported on the side rail 12 by control arm 22. MacPherson strut 24 mounted on the wheel assembly, includes a shock absorber and suspension spring, provides the damped spring suspension support of the vehicle body 26. The dirigible wheel assembly 20 is steered through steering wheel 28 operatively mounted at the upper end of steering column 29 connected to the dirigible wheel assembly by a steering shaft, steering gear and steering linkage not illustrated. Secured to the forward end of the side rail 12 is a telescopic energy absorber unit 30 that, in conjunction with a second and like energy absorber unit attached to an associated side rail, supports a bumper assembly 32 laterally across the front end of the body 26. Such energy absorber and bumper support is generally described in U.S. Pat. No. 4,054,311 for Energy Absorber with Internal Pressure Relief Valve issued Oct. 18, 1977 to Loren R. Gute, hereby incorporated by reference.

The energy absorbing unit 30 comprises an outer cylinder 34 closed by an end cap 36 which has a rearwardly projection pin 38 welded or otherwise fastened thereto. Pin 38 freely extends through a vertical slotted opening 39 in one leg of an L-shaped bracket 40. The end cap 36 is spaced from this leg to allow the positioning of unit 30 within rail 12 to preload the vibration isolator block described below. In turn, the bracket 40 is secured to the interior of the side rail 12 by bolt 42 mounted in the opening in the other leg of the bracket. A nut 44 threaded on the end of the bolt 42 which extends through a bolt hole in the side rail 12 secures the bracket to the side rail. A resilient elastomer grommet 41 inserted in the vertical slotted opening 39 in bracket 40 is used to cushion and limit pin travel during bumper jacking. The air gap between the pin and grommet allows the rear of the absorber 30 to vibrate freely.

In addition to the outer cylinder 34, each energy absorber unit comprises an inner cylinder 46 mounted for telescopic movement within the outer cylinder and which projects axially therefrom. The outermost end of the inner cylinder carries a mounting plate 48 which is adapted to be secured to the bumper 32 by bolts 50 projecting from a bracket fastened to the bumper and by nuts 52 threaded onto the end of the bolts.

The inner end of the cylinder 46 has a cap 54 with a centralized orifice for accommodating a metering rod 56 that extends axially in the energy absorber unit from attachment with the end cap 36. The internal construction and operation of the preferred energy absorber unit is basically the same as that described in the above-identified U.S. Pat. No. 4,054,311 and for particular details of construction and operation reference may be made to that patent. Generally the energy absorber unit 30 is normally urged to an outwardly extended position in which a tapered annular stop sleeve 60 secured to the inner cylinder 46 engages the interior surface of the bulged forward end 62 of the outer cylinder by the pressure of a gas spring on a column of oil in expansible and contractable chambers all within the confines of the energy absorber unit. When the bumper 52 is impacted by an impact load greater than a predetermined load, the telescopic retracting movement of the inner cylinder with respect to the outer cylinder will effect the flow of oil between the oil chambers of the energy absorber unit through the metering orifice so that impact energy is dissipated. After removal of the impact load from the bumper, the energy absorber unit will, by the force exerted by the gas spring, return to its original position to move the bumper back to the pre-impact position at a predetermined rate of recovery.

Figure 2:
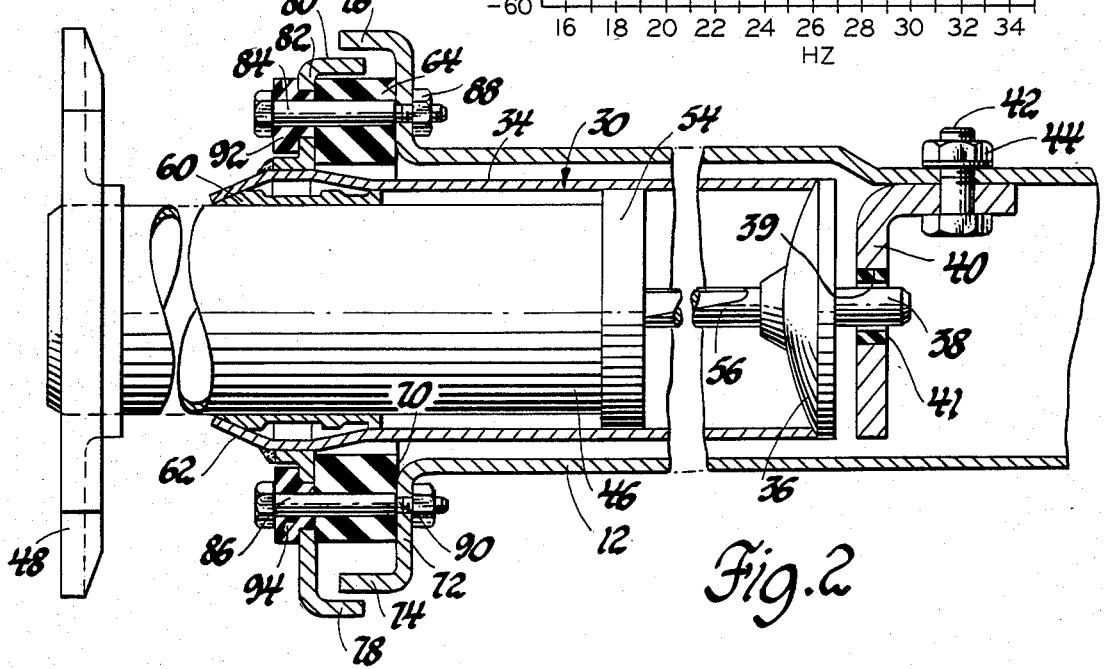
FIG. 2 is a cross-sectional view of the energy absorber and isolator construction utilized to mount the bumper to the vehicle.

A special vibration isolator block 64 of resilient elastomer material is employed to effectively isolate the bumper assembly 32 and the energy absorber unit 30 from the vehicle so that the bumper and the energy absorber can act as a vibration damper to damp engine excited vehicle vibrations. In the installed and preloaded position, the preloaded isolator block is disposed around the energy absorber unit 30 and in radial spaced relationship thereto as shown in FIGS. 1 and 2. Also, the rearward wall 70 of the block 64 seats against the forward face of the end bracket or flanges 72 of the side rail 12. The forwardly extending jacking ears 74, 76 of the end flanges are adapted to overlie and cooperate with corresponding jacking ears 78, 80 of an isolator retainer bracket 82 for vehicle jacking purposes. As best shown in FIG. 2, the retainer bracket 82 is welded on the bulged outer end 62 of the outer cylinder 34. This retainer bracket 82 cooperates with the end bracket 72 of the side rail 12 to sandwich and preload the elastomeric block 64 therebetween from the clamping force of shoulder bolts 84, 86 extending therethrough and receiving nuts 88 and 90. The shoulder length of the shoulder bolts 84, 86 sets the spring rate for optimized isolation and resilient support of the energy absorber unit and attached bumper. Grommets 92, 94 of resilient elastomer material isolate the bolts from the retainer bracket 82.

Figure 3:
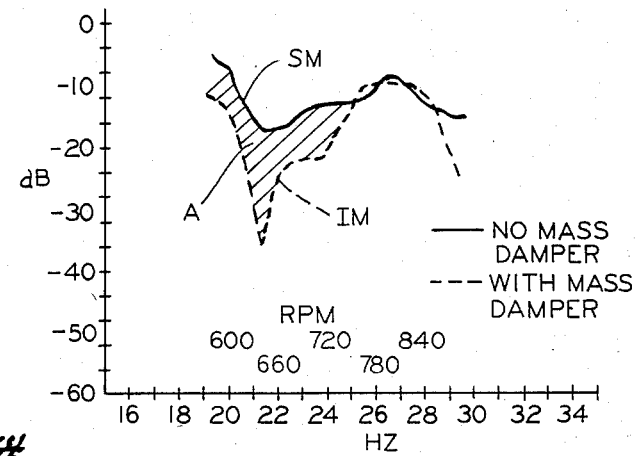
FIG. 3 is a plot of the curves comparing operation of the vibration mass damper of this invention as compared to a similar construction which has no mass damping capability.

In operation, idle shake can occur at the idle speed range of 600-800 rpm and the vibrations set up by the idling engine and transmission can be transferred to components of the vehicle, such at the steering column 30. With the bumper and energy absorber unit 30 resiliently suspended by the isolator, a damping mass is provided to vibrate vertically and in pitch or inclination at its natural frequency to damp vehicle vibrations particularly in the engine idle speed range. The graph of FIG. 3 compares the steering column vibration damping provided by the isolator mounted tuned bumper (curve IM) with damping provided by the solid mounted bumper (curve SM). The ordinate in decibels represents the ratio of amplitude of column vibration to engine oscillation. The abscissa represents engine vibrating frequency. The cross hatched area A between the two curves represents column shake amplitude reduction obtained by this invention over the fixed, non-isolated bumper.

When jacking the car is necessary, the jacking ears 78, 74 and 80, 76 physically contact or ground after limited deflection of elastomeric components to transmit bumper jacking loads to the body. It will also be appreciated that this invention provides primary impact energy absorption through the energy absorbing telescoping unit 30 and auxiliary energy absorption from deflecting the isolator block 64.

In addition to isolating engine induced body vibrations, this construction can isolate and damp road induced body vibrations. Preload is set by the shoulder bolts which limits the clamping movement of bracket 82 toward bracket 72 which stresses the isolator and sets the spring rate for idle shake control. However, the nature of this tuning will attenuate body vibrations above this tuned frequency. This tuned frequency can also be varied by changing isolator rubber compound and shape.

While the preferred embodiment of the invention has been shown and described to illustrate the invention other modifications will become apparent to those skilled in the art. Accordingly, the scope of this invention is set forth in the following claims.

The embodiments of the invention in which an exclusive property or privilege is claimed are defined as follows:

1. A tuned bumper for a motor vehicle having a vehicle body and a vehicle steering column therein to damp vibrations of said vehicle body and said steering column comprising in combination an external bumper disposed at one end of said vehicle body, said vehicle body having support structure for carrying the load of said bumper, connector means for operatively interconnecting said bumper to said support structure, said connector means comprising elongated and telescopic energy absorber means for absorbing the energy of an impact load on said bumper displacing said bumper from a first position outwardly of said vehicle body to a second position adjacent to said support structure, said shock absorber having an inner end spaced from and normally free from contact with said support structure, and resilient elastomer block means preloaded and operatively interposed only between an intermediate portion of said energy absorber means and said support structure to physically space and resiliently isolate said bumper and said energy absorber means from said support structure to allow said bumper to vibrate vertically and in pitch to act as a dynamic vibrating mass to damp vibrations of said vehicle body and components therein.

2. A tuned bumper system for a motor vehicle to damp engine excited vehicle vibrations comprising in combination an external bumper for a vehicle, support structure means within said vehicle for carrying the load of said bumper, energy absorber unit means operatively interconnecting said bumper to said support structure to dissipate energy of impact loads, and preloaded resilient elastomer block means disposed outwardly of and around a portion of said energy absorber unit means intermediate the ends thereof to resiliently isolate said energy absorber and said bumper means from said support structure means to allow said bumper and said energy absorber unit means to vibrate at a natural frequency and act as a dynamic mass to attenuate vibrations of said vehicle body and components therein, first bracket means extenting radially outwardly from said support structure, second bracket means extending radially outwardly from said shock absorber unit means, said first and second bracket means being spaced from one another to sandwich said elastomer block means therebetween, and fastener means for moving said first and second bracket means toward one another to a selected setting so that the spring rate of said elastomer block can be set, and grounding means extending from said bracket means for directly interconnecting said energy absorber and said support structure means after predetermined deflection of said block means to permit the vehicle to be raised by vehicle jacking loads applied to said bumper.

3. The tuned bumper system of claim 2 wherein said grounding means comprises cooperating rigid first and second flange means on said first and second bracket means normally spaced in vertical orientation from each other by said elastomeric block means, said elastomeric block means being deflected on application of said jacking loads so that said first and second flange means physically contact each other allowing said vehicle to be raised by application of the jacking force to said bumper.

* * * * *